Patented Jan. 22, 1924.

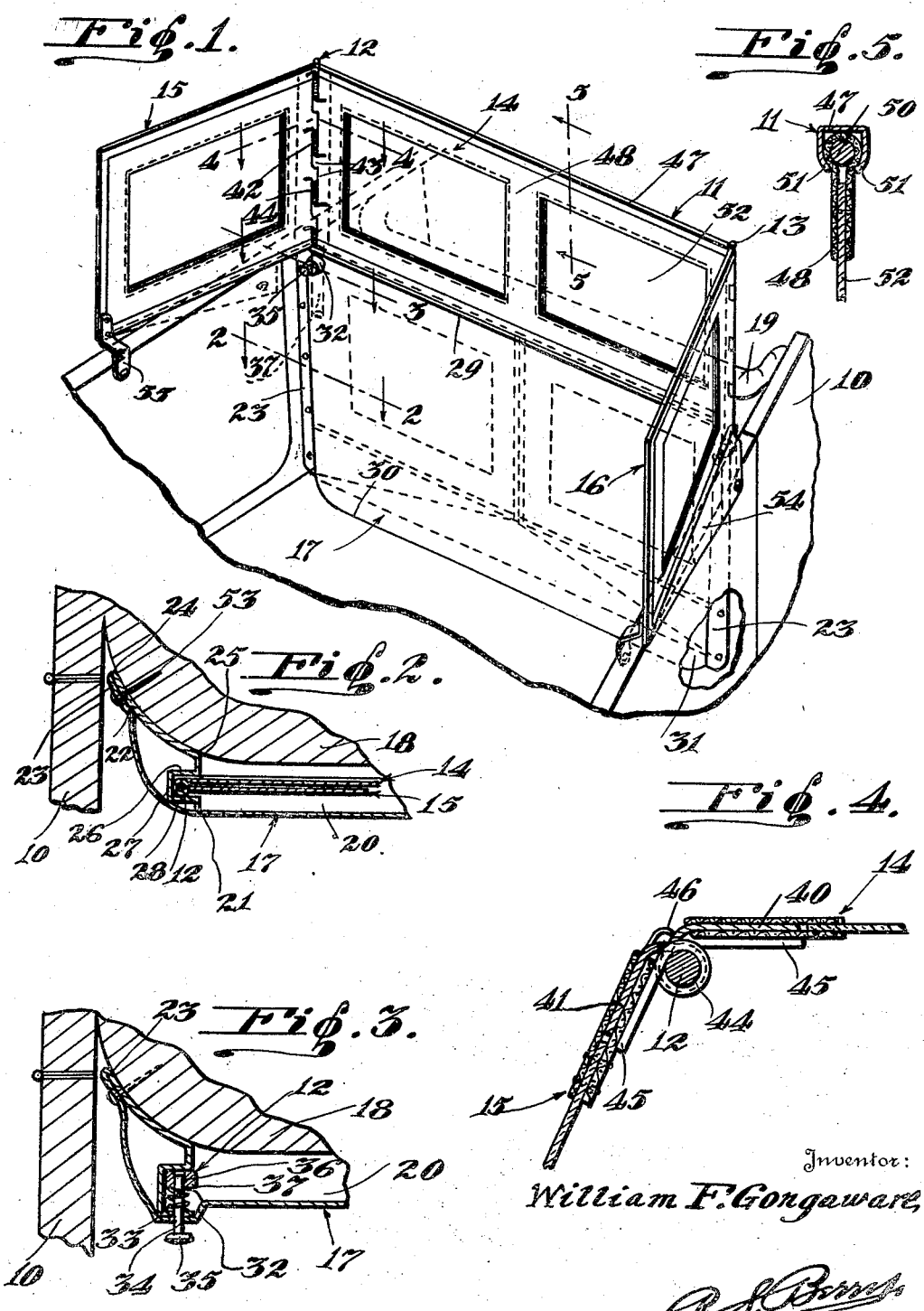

1,481,548

UNITED STATES PATENT OFFICE.

WILLIAM F. GONGAWARE, OF OCEAN PARK, CALIFORNIA.

SAFETY WINDSHIELD CURTAIN.

Application filed November 21, 1921. Serial No. 516,821.

*To all whom it may concern:*

Be it known that I, WILLIAM F. GONGAWARE, a citizen of the United States, residing at Ocean Park, in the county of Los Angeles and State of California, have invented new and useful Improvements in Safety Windshield Curtains, of which the following is a specfication.

My invention relates to windshields and more particularly to windshelds adapted to protect the occupants in the rear seats of an automobile from injury.

An object is to construct the windshield of materials not subject to fracture, splintering or breaking due to shocks resulting from the roughness of the road, causing bouncing and tossing of the automobile and also from careless handling, flying particles or collision making it unsafe for those behind the windshield.

Another object is to provide a foldable windshield adapted to slide into a receptacle fastened to the rear of the front seat, so that the windshield can be placed out of sight when not used.

A further object is to yieldably retain the wings of the windshield in position.

Other objects will hereinafter appear in the specification, be claimed, and shown in the accompanying drawing, in which.

Fig. 1 is a perspective of my windshield in position for use attached to an automobile body.

Fig. 2 is a cross section on the line 2—2 of Fig. 1 showing the windshield in foldable position out of use in the receptacle.

Fig. 3 is a cross section on the line 3—3 of Fig. 1 showing the means for holding the windshield in position for use.

Fig. 4 is a greatly enlarged cross section on the line 4—4 of Fig. 1 to show the tensioning means for yieldably retaining the side members in place.

Fig. 5 is a cross section on the line 5—5 of Fig. 1.

Referring to the drawings by numerals 10 is an automobile body with the windsield 11 in position as in use, having standards 12 and 13 as corner members supporting a central portion 14, a wing 15, yieldingly pivoted to a standard 12 and a wing 16 pivoted in a like manner on the standard 13.

A receptacle 17 is fastened to the seat back 18 of the front seat 19. The receptacle 17 provides a pocket 20 for the reception of the windshield. The receptacle is formed from a flat sheet of metal rounded and beginning at 21 until reaching the seat back 18 thereafter flared at 22 providing a narrow flange 23 the metal is bent upon itself and indicated at 24 the remaining metal is curved to conform to the shape of the seat back 18 substantially to a point in line with the curved beginning 21 of the curved portion, at which it is bent obliquely as at 25 the metal is then bent at right angles thereto forming a side 25 of the guide portion, and into a channel shape having a back web 27 and another side 28 that is fixed to metal at the curved beginning 21 from the upper edge 29 to the lower edge 30. The opposite end 31 of the metal is formed to a corresponding shape and for the same purpose as hereinbefore stated.

As shown in Fig. 3 the metal near the upper edge 29 and on a line with the curved beginning 21 a recess 32 is pressed therein outwardly from the inside of the receptacle 17 providing a clearance space for a spring 33 and a pin 34 with a head 35 so that the pin 34 may be pulled outwardly thus releasing the standard 12 so that the windshield 14 after being folded may slide in the channel guides and into the receptacle 17. A like construction is built at the opposite end 31 for releasing the standard 13.

It will be seen that as the windshield is lifted to a position for use the pins 34 will spring into the opening 36 in the lower ends 37 of the standards 12 and 13.

The details of the hinges 38 and 39 are as follows:

A strip of metal 40 is fixed in the central portion 14 and a strip of metal 41 is fixed in the wing 15.

Strips 40 and 41 are notched as at 42 and the remaining ends 43 bent around the standard 12 said notches being wider than the ends thereby leaving a space between the strips and around the standard 12. Coil springs 44 are placed upon the standards 12 and 13 having the ends 45 thereof straightened to bear on the central portion 14 and on the wings or wind deflectors 15 and 16 to yieldably hold said wings in an open position.

A portion near the edge of the strip 41 is bent to form a stop 46 to control the outward movement of the wing 15 resulting from the action of the coil springs 44.

The moulding 47 around the edges of the central portion 14, the wings 15 and 16 are channel shape in cross section.

A sheet of leather 48 has openings 49 cut therein and is folded over a wire 50 and upon itself. Squares of transparent sheet celluloid 52 are fixed between the sides of leather forming the frames or windows thus constructed.

As shown in Fig. 5 edges 51 of the flanges on the channel moulding 47 are bent inwardly clamping the leather around the wire 50 securely binding the outer edges 51 of the central portion 14 and the wings 15 and 16.

Screws 53 secure the receptacle 17 to the seat back 18.

Flaps 54 are attached to the lower edges of the wings 15 and 16 and adapted to fold over the sides of the body 10.

Straps 55 are fixed to the outer lower corners of the wings 15 and 16 for preventing the spring out of the wings beyond their normal working positions.

While I have shown a practical embodiment of the improved auxiliary windshield, I do not limit myself to the exact details therefore various changes may be made without departing from the spirit of the invention as claimed.

I claim:

1. In a windshield fastened to the rear side of a front seat of a vehicle, a central portion provided with transparent sheets of material, having hingedly connected wind deflectors provided with transparent sheets of material, attached thereto, means for rigidly supporting said windshield in an extended position substantially in line with the back of said front seat, means for yieldably holding said deflectors in open position and a receptacle fixed to the rear side of said front seat in which the windshield may be placed when out of use.

2. In a windshield, a central portion of flexible material provided with strips of metal on either end, said strips having the outer edges formed to receive a rod and provide notches along said edges, wind deflectors having a moulding secured to the upper, lower and outer edge of substantially the same construction as the upper and lower edge of said central portion, said deflectors being provided with a metal strip fixed in the inner ends of said deflectors and of a similar shape corresponding to said strip fixed in said ends of said central portion, the said central portion and said deflectors are joined at the ends, coil springs placed in said notches, and a standard threaded through said metal strip and coil springs thereby forming a hinge connection for said central portion and said deflectors.

3. In a combination with a vehicle body, a windshield, a receptacle, a sheet of metal having the end portions curved and flared to form a flange, the remaining end bent upon the flare and further bent to form a channel, thus providing a guide-way for said windshield and said flange being perforated for the purpose of fastening said receptacle to a seat back.

WILLIAM F. GONGAWARE.